(12) United States Patent
Leoni et al.

(10) Patent No.: US 8,542,429 B1
(45) Date of Patent: Sep. 24, 2013

(54) TECHNIQUES FOR PROTECTING IMAGING ACCESS OF ELECTRONIC PAPER

(75) Inventors: Napoleon J. Leoni, San Jose, CA (US); Omer Gila, Cupertino, CA (US); Henryk Birecki, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 81 days.

(21) Appl. No.: 13/416,190

(22) Filed: Mar. 9, 2012

(51) Int. Cl.
*G02B 26/00* (2006.01)
*G06K 5/00* (2006.01)
*G06K 7/00* (2006.01)
*G06F 7/08* (2006.01)

(52) U.S. Cl.
USPC ........... 359/296; 235/380; 235/381; 235/382; 235/486

(58) Field of Classification Search
CPC ............ G06K 19/04; G06K 19/06187; G06K 19/06196; G06K 19/077; G06K 19/07726; G02F 1/167; G02F 1/172
USPC ................ 359/296; 235/380, 381, 382, 486, 235/494
See application file for complete search history.

(56) References Cited

U.S. PATENT DOCUMENTS

| | | | |
|---|---|---|---|
| 5,538,291 A | 7/1996 | Gustafson | |
| 5,545,883 A | 8/1996 | Sasou et al. | |
| 6,222,513 B1 | 4/2001 | Howard et al. | |
| 6,573,880 B1 | 6/2003 | Simoni et al. | |
| 6,753,999 B2 * | 6/2004 | Zehner et al. | 359/296 |
| 6,795,228 B2 | 9/2004 | Sacripante et al. | |
| 7,188,762 B2 | 3/2007 | Goade, Sr. et al. | |
| 2004/0263470 A1 | 12/2004 | Sprague et al. | |
| 2005/0134550 A1 | 6/2005 | Schmitz | |
| 2006/0125778 A1 | 6/2006 | Apte | |
| 2007/0061214 A1 | 3/2007 | Schmitz | |
| 2008/0186259 A1 | 8/2008 | Todorokihara et al. | |
| 2008/0296367 A1 * | 12/2008 | Parkinson | 235/380 |
| 2009/0122504 A1 * | 5/2009 | Lee | 361/809 |
| 2012/0206341 A1 * | 8/2012 | Gila et al. | 345/156 |
| 2013/0003162 A1 * | 1/2013 | Leoni et al. | 359/296 |

FOREIGN PATENT DOCUMENTS

EA 003306 B1 4/2003

OTHER PUBLICATIONS

"Protect Your Driver's License, Military/Government ID and Credit/Debit Cards with Anti-Electronic Pickpocket Technology Sleeves", Institute of Consumer Financial Education, http://www.icfe.info/credit-card-spending-tips/credit-card-condom-sleeves.html ,(Feb. 2, 2012).

* cited by examiner

*Primary Examiner* — David N Spector (57) ABSTRACT

Techniques for protecting imaging access of electronic paper are described herein. For example, an electronic paper device with protected imaging access includes a substrate, an e-paper surface disposed on the substrate, a removable cover to prevent alteration of the e-paper surface when the cover is disposed over the e-paper surface, and a reversible locking mechanism engaging with the cover to secure the cover in place over the e-paper surface. A method for secure writing to e-paper is also provided.

20 Claims, 11 Drawing Sheets

Section 3B-3B

```
┌─────────────────────────────────────────┐
│  Activating an actuator to unlock the   │
│              cover.                     │
│               710                       │
└─────────────────────────────────────────┘
                    │
                    ▼
┌─────────────────────────────────────────┐
│  Removing the cover to expose the       │
│              e-paper.                   │
│               715                       │
└─────────────────────────────────────────┘
                    │
                    ▼
┌─────────────────────────────────────────┐
│      Altering markings on the e-paper.  │
│               720                       │
└─────────────────────────────────────────┘
                    │
                    ▼
┌─────────────────────────────────────────┐
│ Replacing the cover and locking the     │
│            cover in place.              │
│               725                       │
└─────────────────────────────────────────┘
```

*Fig. 7*

TECHNIQUES FOR PROTECTING IMAGING ACCESS OF ELECTRONIC PAPER

BACKGROUND

Electronic paper ("e-paper") is a display technology designed to recreate the appearance of ink on ordinary paper. E-paper reflects light like ordinary paper and may be capable of displaying text and images indefinitely without using electricity to refresh the image, while allowing the image to be changed later. E-paper can also be implemented as a flexible, thin sheet, like paper. By contrast, a typical flat panel display does not exhibit the same flexibility, typically uses a backlight to illuminate pixels, and constantly uses power during the display. Typical e-paper implementations, such as electronic books ("e-books"), include an e-paper display and electronics for rendering and displaying digital media on the e-paper.

BRIEF DESCRIPTION OF THE DRAWINGS

The accompanying drawings illustrate various examples of the principles described herein and are a part of the specification. The illustrated examples are merely examples and do not limit the scope of the claims.

FIG. 3A-3I show a system and method for removing a protective transparent cover to expose the e-paper in order to alter the writing, according to one example of principles described herein.

FIGS. 4A-4E show a system and method for writing to electronic paper with protected imaging access, according to one example of principles described herein.

Throughout the drawings, identical reference numbers designate similar, but not necessarily identical, elements.

DETAILED DESCRIPTION

E-paper is used in a variety of display applications such as signage, e-books, tablets, cards, posters, and pricing labels. E-paper has several paper-like features. For example, e-paper is a reflective display that uses ambient light as an illumination source. The ambient light strikes the surface and is reflected to the viewer. The usage of pigments similar to those which are used in printing allows the e-paper to be read at a wide range of angles and lighting conditions, including full sunlight. The use of ambient light also eliminates the need for illumination produced by the device. This minimizes the energy used by the e-paper. Additionally, the e-paper does not use energy to maintain the image. Once the image is written, the image remains on the e-paper for an extended period of time or until the e-paper is rewritten. Thus, a typical e-paper primarily uses energy for changes of state.

E-paper is typically written by generating a charge on a surface in proximity to a layer of microcapsules that contain charged pigment particles. The charge on the surface attracts or repels the charged pigment particles in the microcapsules to create the desired image. The pigment particles are stable within the microcapsules after they are moved into position. However, a wide variety of methods can be used to alter the image or text on the e-paper after it has been written. This can restrict the use of e-paper to applications that do not require the images or text to be secure against alteration. However, the principles described below illustrate a removable cover that prevents alteration of e-paper using common techniques such as an electrified stylus or corona discharge mechanisms. By preventing alteration of the e-paper using easily accessible technology, the security of the e-paper improves and the e-paper can be used a wider variety of applications. The removable cover is locked into position over the e-paper by a reversible locking mechanism. The locking mechanism can be disengaged and the e-paper altered using a specialized tool. The cover is then replaced and locked over the e-paper by the locking mechanism. This allows authorized alterations but imposes a significant technological barrier that prevents or reduces unauthorized alterations of the e-paper.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1A:
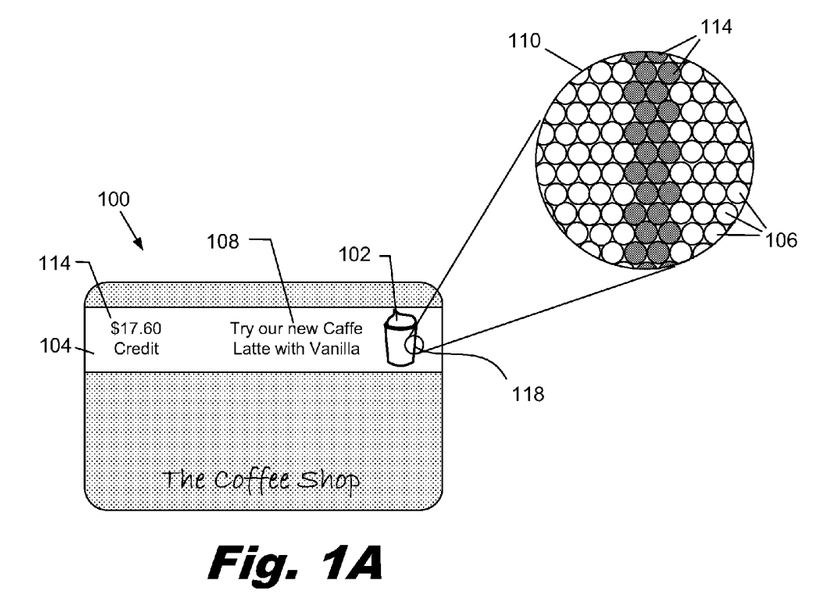
FIGS. 1A and 1B are examples of applications for electronic paper with protected access, according to one example of principles described herein.

FIG. 1A shows a card 100 that includes a strip of e-paper 104. In this example, the card is a gift card or loyalty card that can be used in retail settings. The e-paper 104 records the balance 114 available on the card to make purchases and an advertisement that includes text 108 and a picture of the advertised product 102. As discussed above, it may be desirable to secure the information displayed by the e-paper against alteration. If the balance 114 has not been secured against alteration, it cannot be relied on to accurately communicate the balance of the card. Consequently, other techniques such as a magnetic strip or embedded radio frequency circuitry may be included in the card to communicate the balance of the card.

FIG. 1A also includes an enlargement 110 of a small portion of the e-paper 104. The enlargement 110 shows that this e-paper implementation includes an array of embedded, spherical-shaped microcapsules 106. The line 118, which is part of the product image 102, is created by selectively applying a charge to the e-paper 102. The charge moves the particles within the microcapsules 106. In this example, a charge has been applied that moved dark particles to the front of the microcapsules 106 to form the line 118.

Figure 1B:
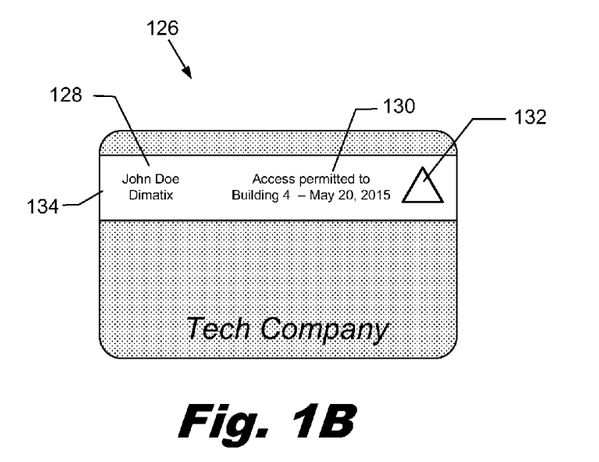

FIG. 1B is a security card 126 that grants the card bearer access to specific buildings for a predetermined period of time. The card bearer's name 128 and access permissions 130, 132 are printed on the e-paper 134. The use of e-paper 134 allows the user and others to visually identify the information that is associated with the card. However, if the e-paper 134 has not been secured against alteration, the text 128, 130 and security symbol 132 cannot be relied upon and alternative techniques are employed to communicate the identity of the card, the name of the card bearer and the access privileges of the card bearer.

As described below, the cards 100, 126 can include a removable cover that prevents alteration of e-paper using techniques such as an electrified stylus, ion heads or corona discharge mechanisms while the cover is in place. By preventing alteration of the e-paper using easily accessible technology, the security of the e-paper improves and the e-paper can be used in a wider variety of applications, including applications that require heightened security. The removable cover is locked into position over the e-paper by a reversible locking mechanism. The locking mechanism can be disengaged, the cover removed and the e-paper altered using a specialized tool. This allows authorized alterations but imposes a significant technological barrier that prevents or reduces unauthorized alterations of the e-paper.

Figure 2:
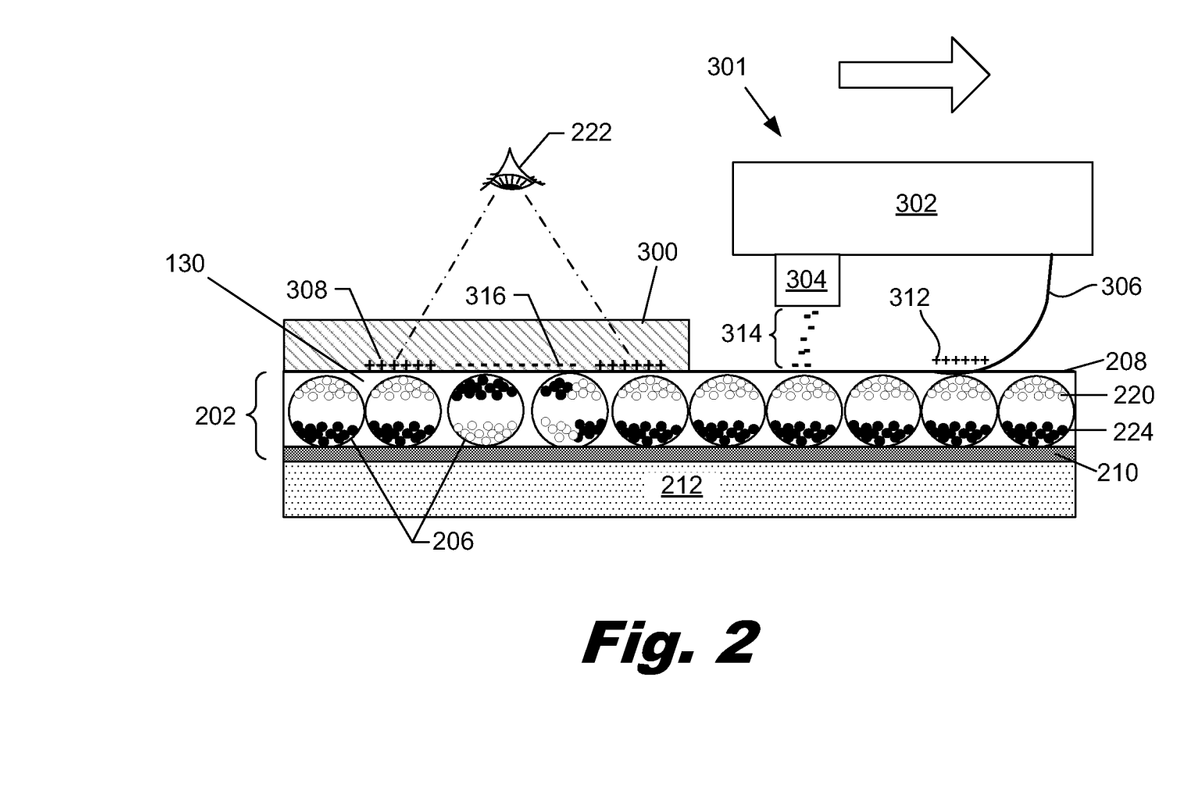
FIG. 2 is cross sectional diagram of an illustrative e-paper printing system printing on e-paper with protected access, according to one example of principles described herein.

FIG. 2 shows an enlarged cross-section of secured e-paper 202 on a substrate 212. The cross-sectional view shows an illustrative multilayer structure of the e-paper 202, including microcapsules 206 sandwiched between a transparent charge receiving layer 208 and a conductive ground layer 210. The conductive ground layer 210 is disposed on a substrate 212.

In this example, each of the microcapsules 106 contain both white particles 220 and black particles 224 suspended in a fluid medium. Ambient light is transmitted through the charge receiving layer 208, strikes the particles 220, 224 and reflects back to the viewer 222. When white particles 220 of a microcapsule 206 are located near the transparent charge receiving layer 208, the microcapsule 206 appears white to a viewer 222, and when the black particles 224 of a microcapsule 206 are located near the transparent charge receiving layer 208 the microcapsule 206 appears black to the viewer 222. The particles 220, 224 can be of opposite charges. For example, the black particles 224 can be positively charged particles and the white particles 220 can be negatively charged particles. Various shades of gray can be created by varying the arrangement of alternating microcapsules with white and black particles located near the charge receiving layer 208 to produce halftoning.

The microcapsules 206 are designed to exhibit image stability using chemical adhesion between particles and/or between the particles and the microcapsule surface. For example, the black and white microcapsules 206 ideally can hold text and images indefinitely without drawing electricity, while still allowing the text or images to be changed later.

The structure, materials, and dimensions of the various layers and components shown in FIG. 2 can be adapted to specific design criteria. In one implementation, the transparent charge receiving layer 208 can be composed of a transparent polymer and can range in thickness from approximately 100 nm to approximately 14 µm. The transparent charge receiving layer 208 can also be composed of a material that holds charges or is porous or semi-porous to charges and/or ions. The transparent charge receiving layer 208 can also be composed of a first insulating layer and second patterned conductive layer.

The microcapsules 206 can have a diameter of approximately 50 µm but may also range in diameter from approximately 20 µm to approximately 100 µm. The conductive ground layer 210 can be composed of a transparent conductive material, such as indium tin oxide, or an opaque conductive material and can have a thickness ranging from approximately 5 nm to approximately 1 mm. In one example, the e-paper 202 has a total thickness of approximately 100 µm. The substrate 212 can be composed of an opaque or transparent material and can range in thickness from approximately 20 µm to approximately 1 mm, or the thickness can be much larger depending on the how the e-paper 202 is used. The substrate 112 can be composed of polyester, plastic, transparent Mylar®, or other suitable material.

A variety of other configurations may be used. For example, the microcapsule may include black particles suspended in a white colored fluid. The black particles can be positively charged particles or negatively charged particles. One or more microcapsules form a pixel of black and white images displayed on the e-paper. The black and white images are created by placing black particles near or away from the charge receiving layer. For example, the microcapsules with black particles located away from the transparent charge receiving layer reflect white light, corresponding to a white portion of an image displayed on the e-paper. By contrast, the microcapsules with black particles located near the charge receiving layer, appear black to the viewer, corresponding to a black portion of the image displayed on the e-paper. Various shades of gray can be created using halftoning to vary the arrangement of alternating microcapsules with black particles located near or away from the charge receiving layer.

FIG. 2 also describes writing to the illustrative secured e-paper 202 with a writing system 300. The writing system 300 includes a writing module 302, writing unit 304, and an erasing unit 306. The writing unit 304 and erasing unit 306 are connected to the same side of the writing module 302 that faces the outer surface 308 of the charge receiving layer 208, with the writing unit 304 suspended above the surface 308. In the example of FIG. 2, the writing unit 304 is an ion head and the erasing unit 306 can be an electrode that comes into close contact with, or can be dragged along, the surface 308 in front of the ion head 304. The writing module 302 can be moved in the direction indicated by the arrow and the e-paper 202 can be held stationary; or the e-paper 202 can be moved in the opposite direction and the writing module 302 held stationary; or the writing module 302 and e-paper 202 can be moved simultaneously. In the example shown in FIG. 2, the black particles 224 and the white particles 220 of the microcapsules 206 are positively charged and negatively charged, respectively. The erasing unit 306 erases any information stored in the microcapsules 206 prior to writing information with the ion head 304. As the e-paper 202 passes under the writing module 302, the positively charged erasing unit 306 can remove negatively charge ions attached to the surface 308. The positively charged erasing unit 306 also creates electrostatic forces that drive positively charged black particles 224 away from the charge receiving layer 208 and attract negatively charged white particles 220 toward the charge receiving layer 208. By passing the erasing unit 306 over the charge receiving layer 208, the information written to the e-paper 202 is erased by positioning the negatively charged white particles 220 near the top of the microcapsules 206 and pushing the positively charged black particles 224 to the bottom of the microcapsules 206. Additionally or alternatively, a corona source or the ion head 304 could be used to erase prior images present on the e-paper 202.

FIG. 2 also shows an illustrative writing operation performed by the ion head 304. The ion head 304 is designed and operated to selectively eject ions 314 (shown as black bars) toward the charge receiving layer 208, when a region of the e-paper 202 located beneath the ion head 304 is to be changed from white to black. The ions 314 reach the surface 308 and remain on the surface to create negatively charged areas 316. The negatively charged white particles 220 are repelled and driven away from the negatively charged areas 316 on the charge receiving layer 208, while the positively charged black particles 224 are attracted to the negatively charged area 316 and driven toward the charge receiving layer 208. Thus, to a viewer 222, the positively charged areas of the charge receiving layer 308 will appear white and the negatively charged areas 316 will appear black.

In addition to ion heads, a number of alternative writing devices can be used to write on the e-paper 202 or alter the contents of the e-paper 202. One of the simplest writing devices is a charged stylus that is manually brought into proximity with the charge receiving surface. The tip of the charged stylus creates an electromagnetic field which can influence the position of the charged pigments in the microcapsules 206.

Securing e-paper 202 against unauthorized alteration by a charged stylus, other field writing device, or ion head can result in e-paper 202 being significantly more secure. Consequently, the visual information conveyed by the e-paper 202 could be relied on to a greater extent. This may reduce the need for alternative technology to be incorporated into the card. Further, the information conveyed by secured e-paper 202 could be used to visually verify the information conveyed by a magnetic strip, embedded microchip or other technology. In one example, a transparent cover is placed over the e-paper 202 after it is written. The transparent cover allows images on the e-paper 202 to be viewed but prevents alteration of the e-paper 202 while it is in place. Additionally, the transparent cover protects the e-paper from mechanical abrasion and damage. The transparent cover can be locked into place using a variety of methods, including those described below. A specialized card writer is used to unlock the transparent cover, remove it from the e-paper surface and alter the images on the e-paper surface and then secure the transparent cover back in place.

FIGS. 3A-3I show one example of a card with protected imaging access. The card includes e-paper, a cover, and a locking mechanism. In this example, the locking mechanism on the card engages and disengages the transparent cover to restrict its movement. If a cardholder wishes to make a purchase with the card, the value on the e-paper display can be updated as described below.

Figure 3A:
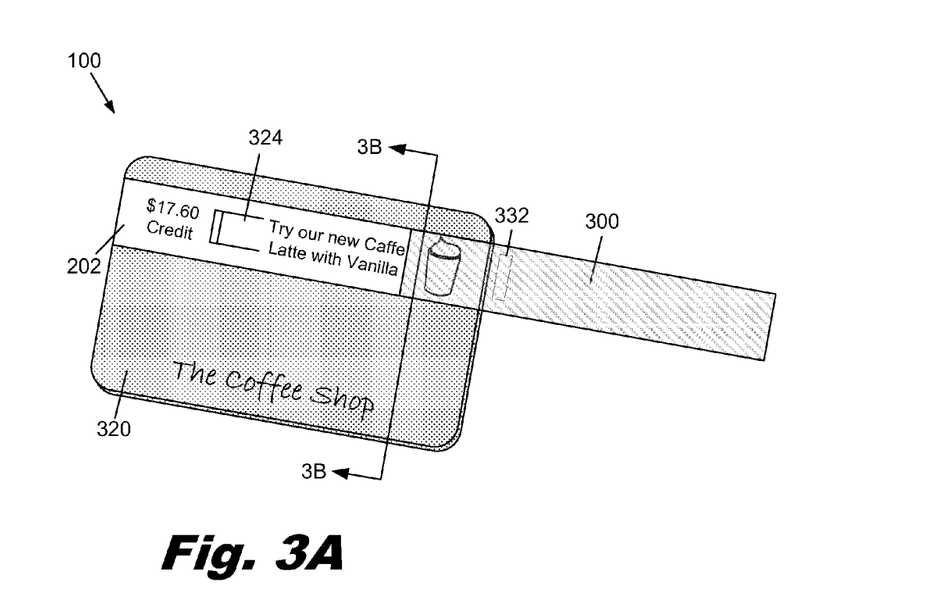

FIG. 3A is a perspective view of the card 100 with a transparent cover 300 moved to the right to expose a portion of the underlying e-paper 202. The transparent cover 300 slides in a channel formed in the substrate 320 of the card 100. Also formed in the substrate 320 of the card is a locking mechanism 324 that engages a corresponding aperture 332 in the cover 300 to secure the cover 300 in place. In this implementation, the cover 300 is transparent or translucent and allows the e-paper 202 to be visible when covered by the cover.

Figure 3B:
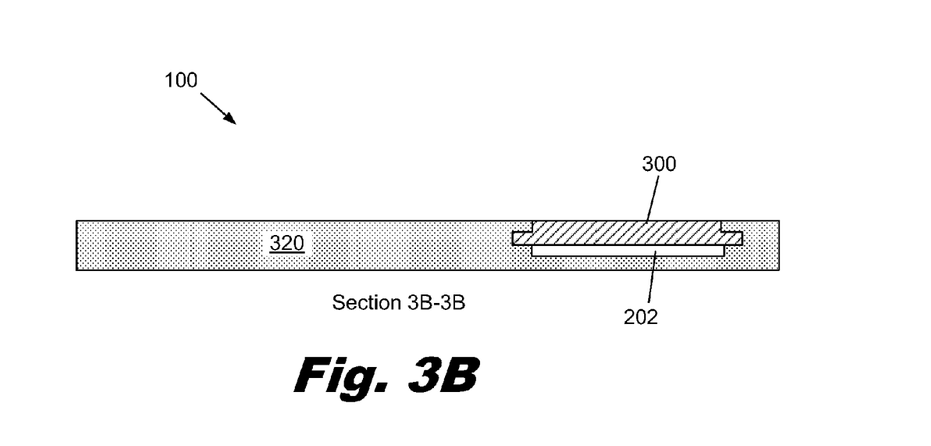

FIG. 3B shows a cross section of the card 100 along line 3B-3B. This cross section illustrates the shape of the cover 300. The cover 300 has a lip that fits into a corresponding shape of a channel in the substrate 320 of the card 100. In this example, the cover 300 has an inverted "T" shaped cross-section. The cover 300 has a lip that fits into the channel of the substrate 320, which restrains the motion of the cover but allows the cover to slide along the length of the channel as shown in FIG. 3A. The e-paper 202 is located underneath the cover 300. As discussed above, a locking mechanism, such as a latch, restrains the motion of the cover 300 along the length of the channel.

Figure 3C:
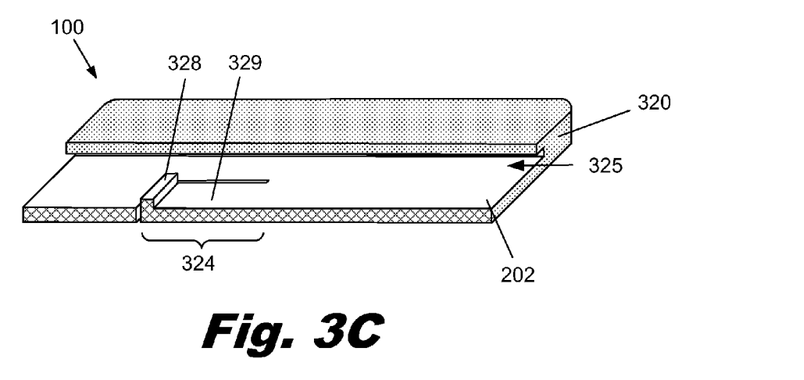

FIG. 3C-3H show a perspective cross-sectional view of the card 100. The cross section is taken along the length of the e-paper 202 and channel. FIG. 3C shows the substrate 320, a portion of the channel 325, e-paper 202 on the bottom of the channel 325 and a simple locking mechanism 324. The cover has not yet been put in place. In this example, the locking mechanism 324 is a cantilevered beam 329 with a tab 328 formed on the end that extends above the upper surface of the e-paper 202.

Figure 3D:
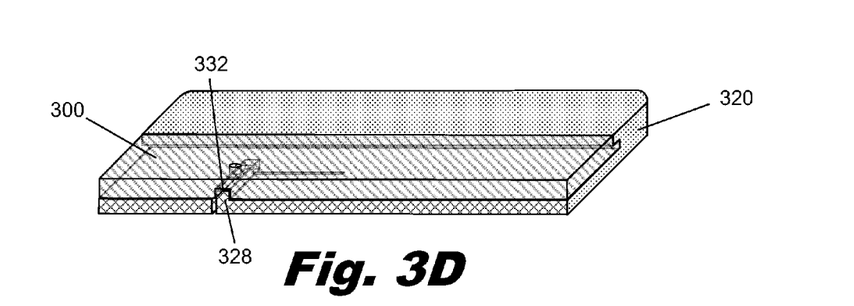

In FIG. 3D, the cover 300 has been put in place and the tab 328 on the locking mechanism has engaged with a corresponding aperture 332 in the cover 300. The cover 300 is now securely fastened to the substrate 320. The channel 325 and the locking mechanism 324 prevent the cover 300 from moving and prevent writing to the e-paper 202. Until the locking mechanism 324 is disengaged from the aperture 332, the cover 300 cannot slide down the channel. More than one locking mechanism 324 may be included on the card 100 to increase the level of complexity and prevent unauthorized alteration of the e-paper 202.

Figure 3E:
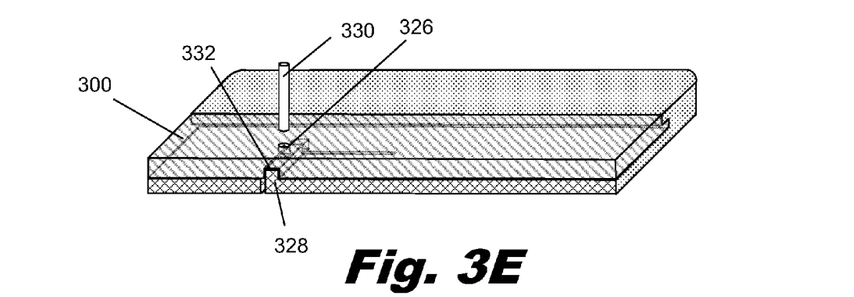

FIG. 3E shows a pin 330 being inserted through a hole 326 in the cover 300 to depress the tab 328 on top of the locking mechanism 324 and force it out of the aperture 332 in the cover 300.

Figure 3F:
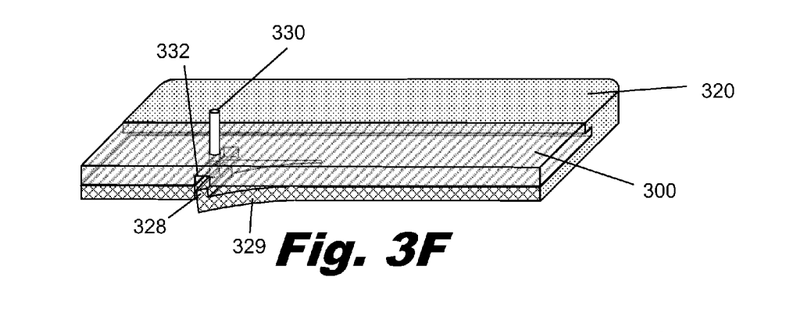

FIG. 3F shows the pin 330 pressing downward on the tab 328. This bends the cantilevered beam 329 that supports the tab and forces the tab out of the aperture 332 in the cover 300. This disengages the substrate 320 from the cover 300 and the cover 300 can then slide along the channel to expose the underlying e-paper. The exposed e-paper can then be altered as desired using any of a number of techniques described above. After erasing/writing is complete, the cover 300 can be slid back into place and prevent any further alterations.

Figure 3G:
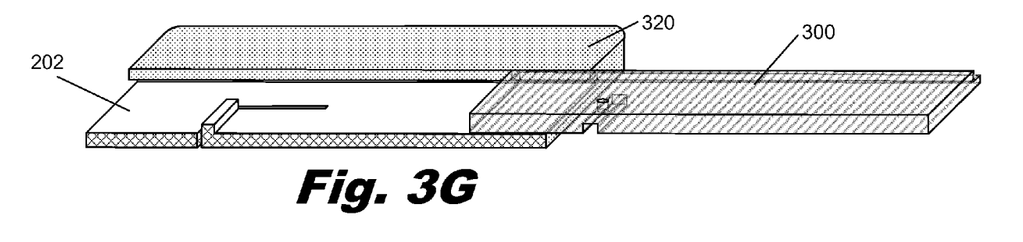

After the transparent cover 300 and substrate 320 have been disengaged from each other, the cover 300 has freedom to move. FIG. 3G shows the transparent cover 300 slid to the right and the e-paper 202 exposed underneath. After the e-paper 202 has been exposed, a new balance or any other new information on the card can be written on the e-paper 202 with methods mentioned above.

Figure 3H:
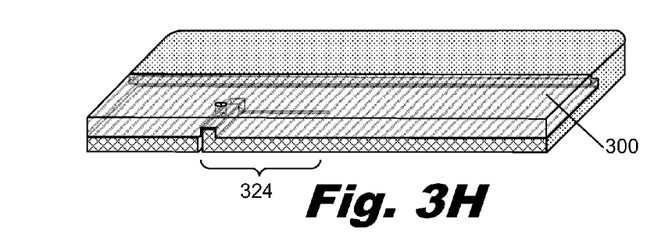

In FIG. 3H the transparent cover 300 is slid back into position and the locking mechanism 324 reengages with the cover 300 to secure it in place.

Figure 3I:
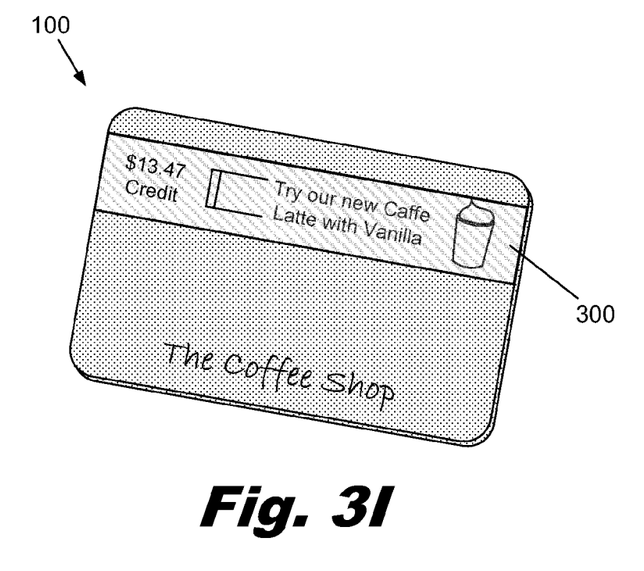

FIG. 3I shows the card 100 after a purchase was made. The card 100 has been rewritten as described above to show the appropriate balance ($13.47) on the card. As discussed above, the protective transparent cover 300 was temporarily opened to write and then closed to protect the e-paper during regular use. When closed, the protective transparent cover 300 protects the e-paper not only from tampering but from mechanical abrasion and contamination. This protects the e-paper functional layers from damage over its lifetime. The cover, e-paper, and locking mechanisms fit within the limited thickness of a standard credit card form factor. The locking mechanisms described herein allow a properly designed tool to easily open the cover while preventing anyone without the tool from opening the card.

The difficulty in disengaging the locking mechanism(s) is directly related to the level of security provided by the cover. For example, if the locking mechanism is relatively simple, as shown above, the card would provide a lower level of security than a card that used a more complex locking mechanism. More complex locking mechanisms can be created in a number of ways, including increasing the number of mechanisms that engage the cover, concealing the locking mechanism so that it is more difficult to circumvent, creating locking mechanisms that require specialized equipment to disengage, and creating locking mechanisms that require a high level of precision/coordination/sequencing to disengage. Additionally, tamper detection could be used to discover cards that have been surreptitiously altered.

Figure 4A:
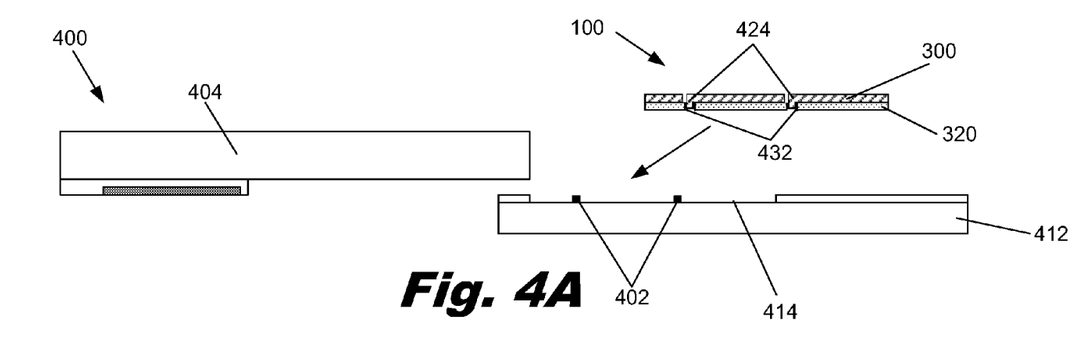

FIGS. 4A-4E show a card that incorporates a locking mechanism with two latches and a specialized card writing device that allows locking mechanism to be disengaged and the e-paper of the card to be altered. FIG. 4A shows cross sectional view of the card taken along the length e-paper and side view of the specialized card writing device 400 which includes a base 412 and a sliding writing head 404. The base 412 includes a cavity 414 to receive the card. Inside the cavity 414 there are two protrusions 402 that engage the apertures 432 in the card 100. The card 100 includes two locking mechanisms 424 that are similar to those described in FIGS. 3A-3I. However, in this example, the cantilevered beams and tabs are formed in the transparent cover 300, not the card substrate 320. The card substrate 320 includes two apertures 432 that pass through the bottom of the channel. The card includes a channel that allows the cover 300 to slide when the tabs on the cover 300 are not engaged with the apertures 432 in the bottom of the channel.

Figure 4B:
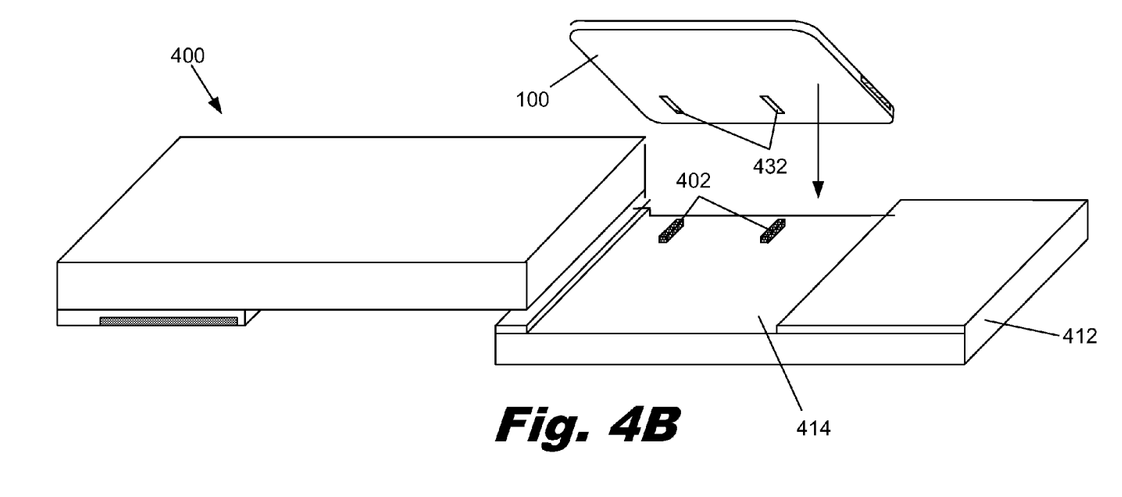

FIG. 4B shows a perspective view of the specialized card writing device 400 and card 100 being placed into the cavity 414 of the base 412 so that the protrusions 402 pass into the apertures 432 and disengage the tabs.

Figure 4C:
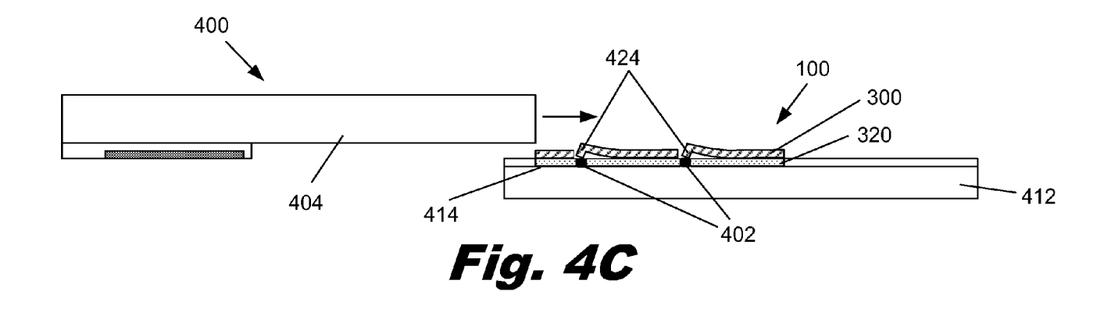
Figures 4D, 4E:
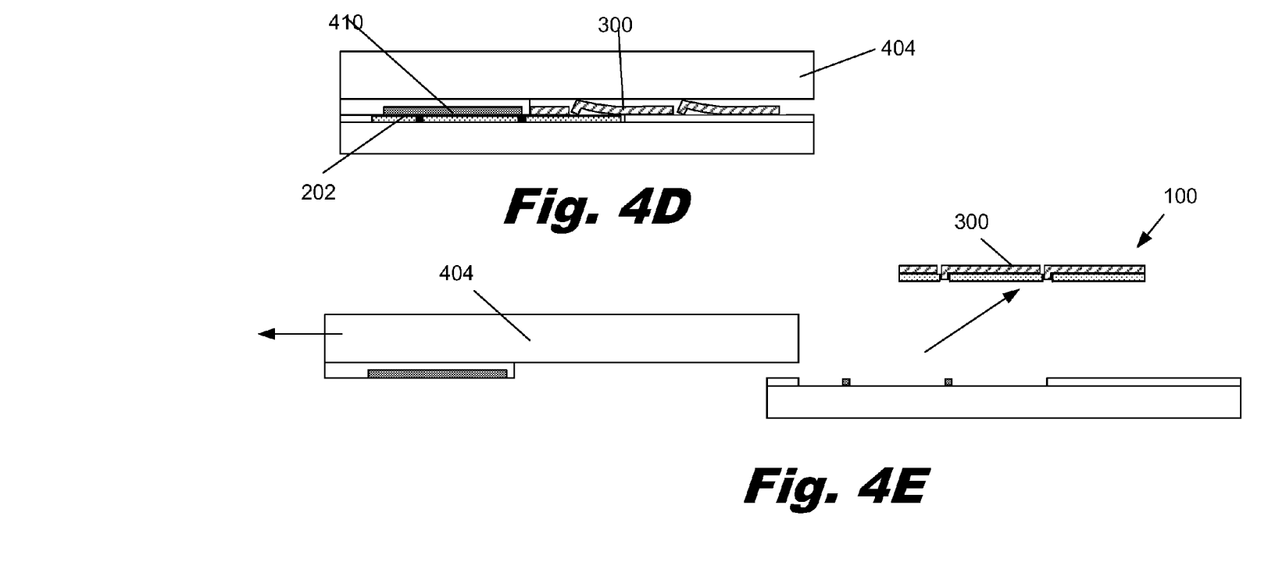

FIG. 4C shows a side view of the specialized card writing device 400 with the card 100 placed in the cavity 414 with the protrusions 402 pushing the tabs of the locking mechanisms 424 in the cover 300 out of the apertures in the card substrate 320. The sliding writing head 404 is then slid over the base 412. FIG. 4D shows that as the sliding writing head 404 slides over the base 412, the transparent cover 300 is also slid to the right with it, leaving the e-paper exposed. The writing head 410 is then in place over a portion of the exposed e-paper 202 and the information on the e-paper can be altered as needed.

As shown in FIG. 4E, after the writing is complete the sliding writing head 404 is moved to the left, returning the cover 300 to its original position as shown. The card 100 can then be removed from the specialized device.

Having the tabs and flexures in the cover rather than the substrate may have a number of advantages. For example, by incorporating the tabs and flexures into the cover, more of the bottom of the channel in the substrate can be covered with e-paper. Further, the e-paper surface is not disrupted by protrusions that extend upward. This may simplify writing to the e-paper.

The cover may be formed out of any of a number of materials. A transparent cover may be formed using any of a number of materials, including polycarbonate, acrylic, polyvinylchloride, polymethylmethacrylate, biaxially-oriented polyethylene terephthalate, polyester or other suitable transparent material. The cover may include a number of characteristics or additives that improve the security of the card, such as transparent fibers to increase the mechanical strength/stiffness of the cover or a transparent conductive layer that dissipates electrical charges.

Although the cover has been described as transparent, it may be opaque or translucent. For example, if there is an application where it is not desirable for the writing on the e-paper to be seen except by authorized persons, the e-paper may be covered by an opaque cover. In some embodiments, the card bearer may not even be aware that the cover exists.

FIGS. 5A-5C and 6A-6C show several additional illustrative locking mechanisms. These locking mechanisms are given only as examples and are not intended to be exhaustive. A variety of locking mechanisms could be used to secure the cover according to principles described herein.

Figure 5A:
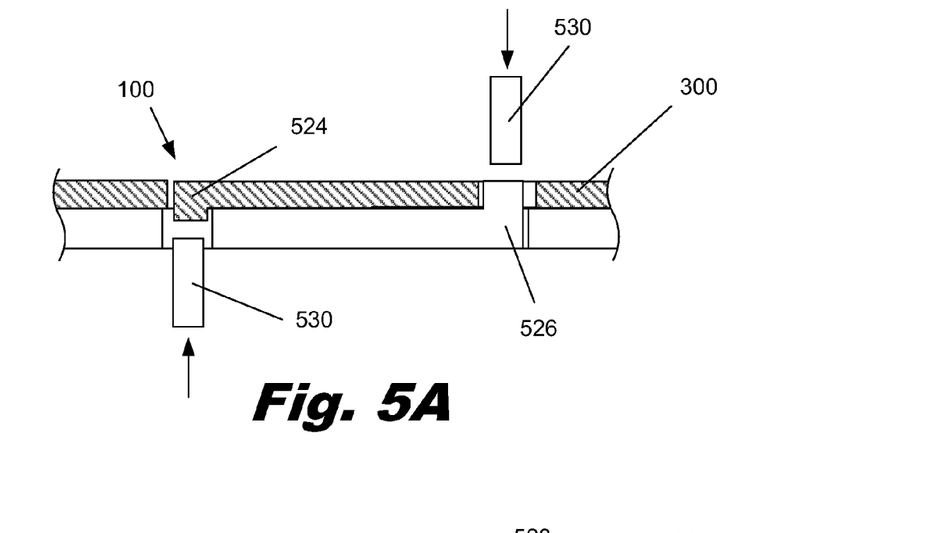
FIGS. 5A-5C show examples of latching mechanisms, according to one example of principles described herein.

FIG. 5A is a cross section of a card 100 showing a locking mechanism that includes cantilevered tabs 524, 526 that are actuated by pins 530 from both sides of the card 100. This increases the difficulty in sliding the cover 300 without specialized tools because the two cantilevered tabs 524, 526 need to be actuated simultaneously and from different directions.

Figure 5B:
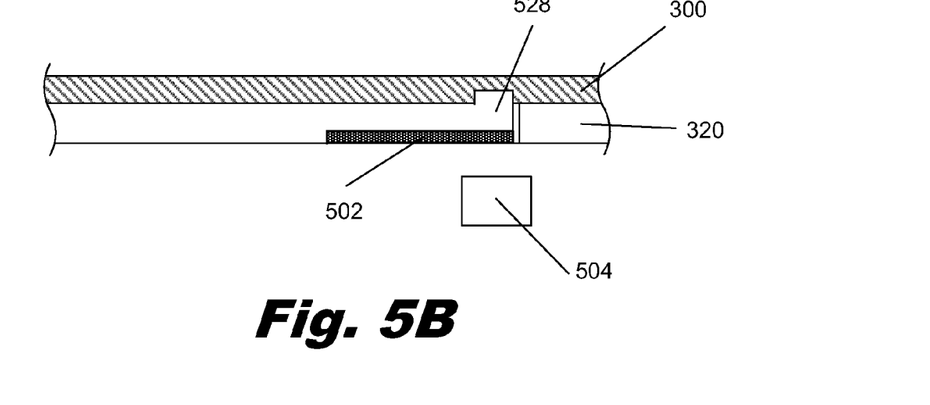
Figure 5C:
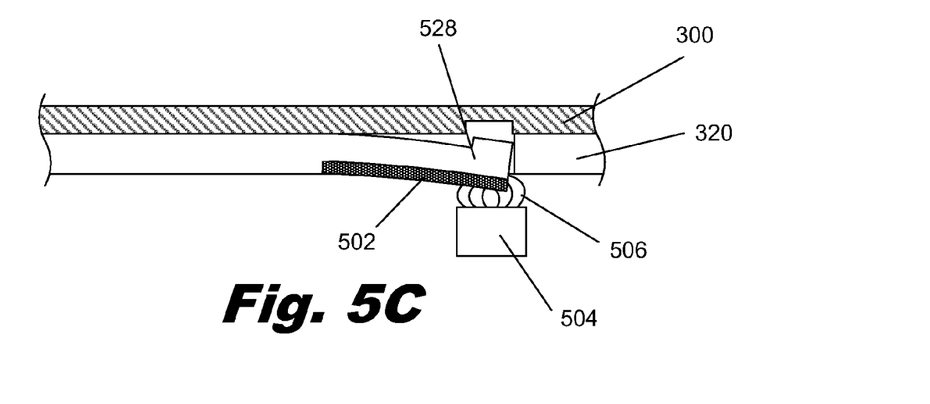

FIG. 5B shows the cross section of a locking mechanism that includes a cantilevered tab 528 in the card substrate 320 that engages a groove in the cover 300. The tab 528 includes a magnetic material 502 on its back surface. When placed on the base of a writing device, an electromagnet 504 in the base can be actuated to draw the tab 528 out of the groove in the cover 300, as shown in 5C. The magnet 504 induces a magnetic field 506 that pulls the cantilevered tab 528 with the magnetized material 502 and disengages from the groove in the cover 300. The magnetic material on the cantilevered tabs may be a ferrous material or a magnet. If the magnetic material is a ferrous metal (such as iron, nickel, cobalt, alloys) the polarity of the electromagnet is not important. Either polarity can attract the ferrous metal and withdraw the tab.

Where magnets are used on the cantilevered tabs, the polarity of the electromagnets becomes important. In some embodiments, a series of tabs with different magnetic polarities can be used. This series of tabs could only be withdrawn by a properly ordered series of electromagnets. The implementations shown in FIGS. 5B and 5C may have a number of advantages including maintaining a smooth uniform outer surface of the cover. This could increase the robustness of the device by preventing dirt and fluids from accessing the e-paper through the cover. Additionally, there are no features on the upper surface to interrupt the viewing of the underlying e-paper.

FIGS. 5B and 5C are only one example of a magnetically actuated locking mechanism. A variety of other embodiments may be used. For example, moving magnets or other mechanisms that are encapsulated within the substrate could be used as locking mechanisms.

Figure 6A:
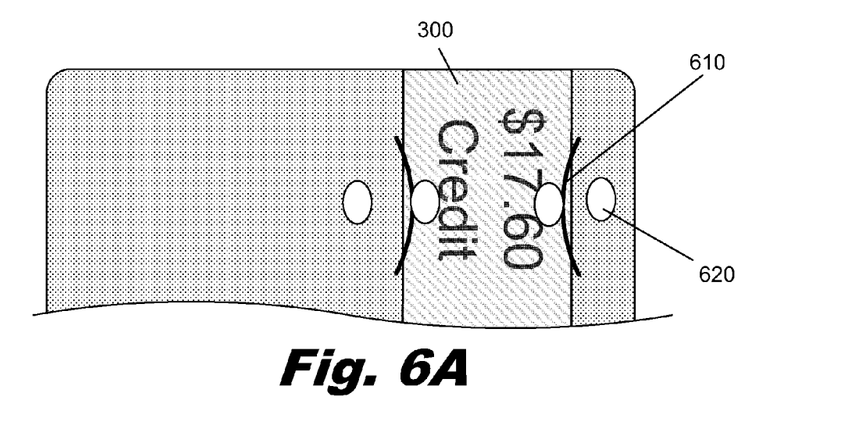
FIGS. 6A-6C show an illustrative locking mechanism for removably securing a cover over e-paper, according to one example of principles described herein.
Figure 6B:
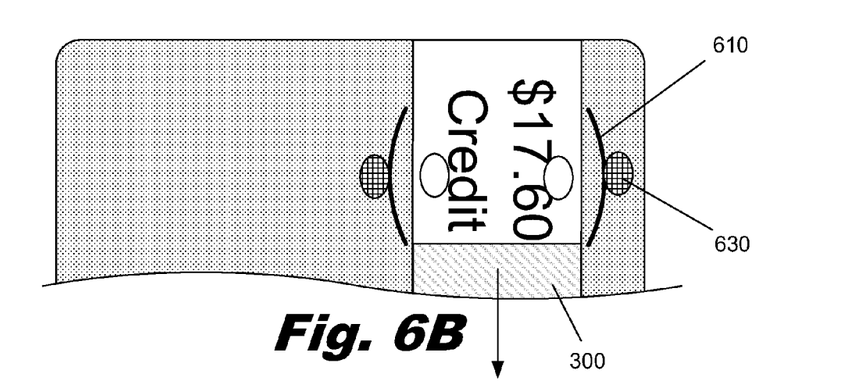
Figure 6C:
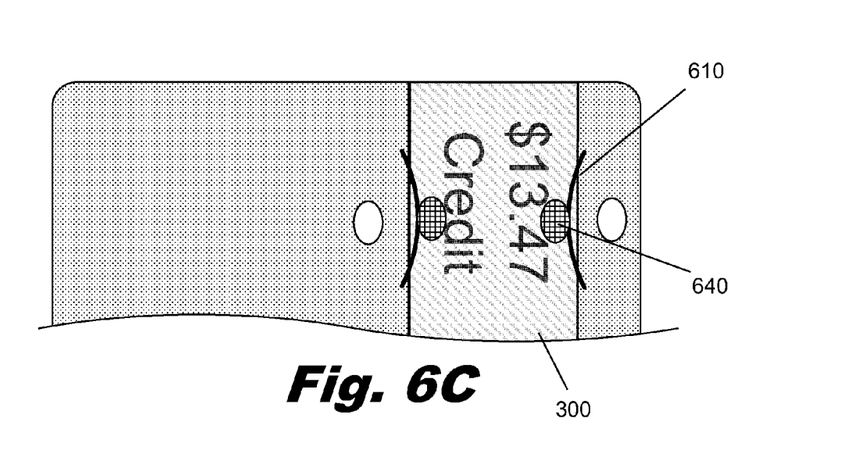

FIGS. 6A-6C show bistable mechanisms 610 that engage the sides of the cover 300. In this example, the bistable mechanisms 610 are curved pieces of metal wire that are supported at each end. The bistable mechanisms have two stable positions. In FIG. 6A the bistable mechanisms 610 are shown in a first position where they are arched inward toward the cover 300 and hold it in place. The ovals 620 that are superimposed over the card represent magnetic actuators that are used to change the bistable mechanisms 610 between their stable states. In FIG. 6A, the bistable mechanisms 610 may engage apertures in the sides of the cover 300 or hold the cover 300 in place using friction.

FIG. 6B shows the outer electromagnetic actuators, represented by the outer shaded ovals 630, moving the bistable mechanisms 610 to a second stable state that is arched away from the cover 300. In this configuration the bistable mechanisms 610 have disengaged from the cover 300 so that it can slide and the e-paper can be altered.

FIG. 6C shows the inner electromagnetic actuators, represented by the inner shaded oval 640, moving the bistable mechanisms 610 back to their original state to lock the cover 300 over the altered e-paper.

This approach may have a number of advantages including using locking mechanisms that are entirely contained within the card and using actuation that would not be apparent from inspection of the card.

A variety of other approaches could be used. For example, the cover could be adhered to the substrate using thermal glue. To remove the cover, the thermal glue is heated so that its strength and/or adhesion properties are reduced. This allows the cover to be removed from over the surface of the substrate. The e-paper is then altered as desired and the cover replaced. The thermal glue is then cooled and holds the cover in place.

Additional security can be obtained by using techniques to detect cards that may have been tampered with. These techniques may include incorporating features on the locking mechanisms that break if they are not properly opened or covers provide visual indication of unusual stresses that occur when the cover is pried off or otherwise removed without the use of a proper actuator. This would allow detection of tampered cards at the point of use. The cards and/or card users could be more carefully inspected and the transaction rejected if necessary.

Figure 7:
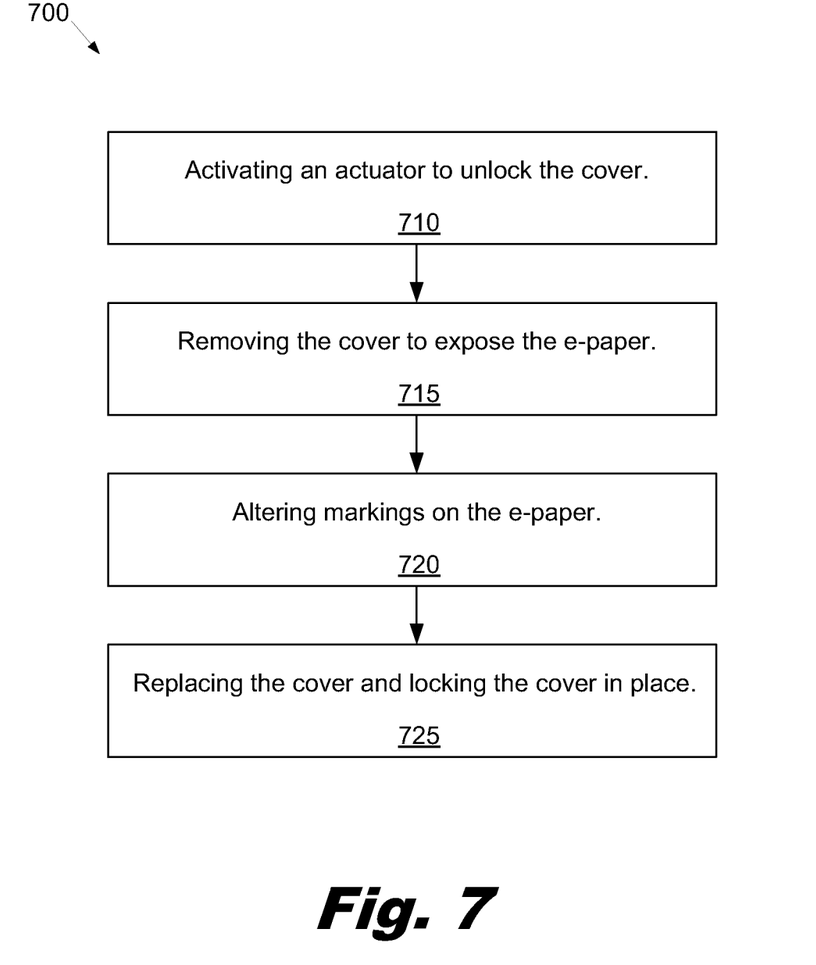
FIG. 7 is a flow chart of a method for writing to e-paper with protected imaging access, according to one example of principles described herein.

FIG. 7 is a flowchart that describes one method for writing to e-paper with protected imaging access. The method includes placing e-paper with a cover in a writing device and activating an actuator to unlock the cover (block 710). As discussed above, the e-paper may have a variety of sizes and shapes, including a card. The locking mechanism may include mechanical, electrical, magnetic or chemical locking techniques, with appropriate actuators for disengaging the locking mechanism or mechanisms. For example, the e-paper may be pressed over protrusions to disengage cantilevered latches to allow the cover to slide off the e-paper. Additionally or alternatively, the activating the actuator may include energizing electromagnets to disengage a latch holding the cover in place. In some implementations, multiple actuators may be needed to unlock the cover. These actuators may be simultaneously engaged with multiple latches or other locking mechanisms holding the cover in place.

The cover is removed to expose the e-paper (block 715). The markings on the e-paper are altered (block 720). Altering markings may include erasing current markings on the e-paper and/or writing new markings on the e-paper. The cover is replaced and locked into place (block 725) to protect the e-paper from unauthorized authorization. The altered e-paper can then be removed from the writing device.

By providing protective/removable access to the e-paper within a card (or other e-paper application), the use of the card is separated from the writing of the card. This passively improves the security of the card against alteration or reimaging with an unauthorized device. The implementations and principles described above allow separate optimization of mechanical protection of e-paper from electrical characteristics of the e-paper. The mechanical protection of the removable cover guards the e-paper from abrasion and unauthorized tampering. The optimized electrical characteristics provide improved resolution and smaller dot sizes. The locking mechanisms that hold the cover in place can be automatically disengaged as part of the writing process but provide a significant barrier against tampering The preceding description has been presented only to illustrate and describe examples of the principles described. This description is not intended to be exhaustive or to limit these principles to any precise form disclosed. Many modifications and variations are possible in light of the above teaching.

What is claimed is:

1. An electronic paper device with protected imaging access comprising:
   a substrate;
   an e-paper surface disposed on the substrate;
   a removable cover to prevent alteration of the e-paper surface when the cover is disposed over the e-paper surface; and
   a reversible locking mechanism engaging with the cover to secure the cover in place over the e-paper surface.

2. The device of claim 1, in which the removable cover is for prevention of alteration of the e-paper surface using an ion head.

3. The device of claim 1, in which the cover is a transparent window.

4. The device of claim 1, in which the locking mechanism is mechanically actuated to release the cover.

5. The device of claim 1, in which the locking mechanism comprises a bistable flexural mechanism.

6. The device of claim 1, in which the locking mechanism engages edges of the cover.

7. The device of claim 1, in which the locking mechanism comprises magnetic material.

8. The device of claim 7, in which the locking mechanism comprises a plurality of magnets with varying polarities.

9. The device of claim 1, in which the reversible locking mechanism comprises at least one cantilevered latch with a tab that engages with an indentation in a mating component.

10. The device of claim 9, in which the reversible locking mechanism comprises a cantilevered latch formed in the substrate and the indentation is in the cover.

11. The device of claim 9, in which the reversible locking mechanism comprises a cantilevered latch formed in the cover and the indentation is in the substrate.

12. A card writer for secure writing to e-paper comprising:
   a base;
   an actuator for actuating a reversible locking mechanism of a removable cover covering an e-paper surface; and
   a writing head to write to the e-paper surface.

13. The system of claim 12, in which the writing head is an ion head.

14. The system of claim 12, in which the actuator comprises a protrusion that mechanically engages a cantilevered latch.

15. The system of claim 12, in which the actuator comprises a magnet.

16. The system of claim 12, in which the actuator is for simultaneously engagement of two separate reversible locking mechanisms of the removable cover.

17. A method for secure writing to e-paper comprising:
   activating an actuator to unlock a reversible locking mechanism of a removable cover covering an e-paper surface;
   removing the cover to expose the e-paper;
   altering markings on the e-paper; and
   replacing the cover and locking the cover in place.

18. The method of claim 17, in which altering markings comprises erasing current markings on the e-paper and writing new markings on the e-paper.

19. The method of claim 17, in which activating an actuator to unlock the cover comprises pressing the e-paper over protrusions to disengage cantilevered latches to allow the cover to slide off the e-paper.

20. The method of claim 17, in which activating an actuator to unlock the cover comprises simultaneously engaging multiple latches holding the cover in place.

* * * * *